(12) United States Patent
Nakaike et al.

(10) Patent No.: US 8,271,739 B2
(45) Date of Patent: Sep. 18, 2012

(54) MEMORY CONTROL APPARATUS, PROGRAM, AND METHOD

(75) Inventors: Takuya Nakaike, Kanagawa-ken (JP);
Rei Odaira, Kanagawa Prefecture (JP);
Takeshi Ogasawara, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 346 days.

(21) Appl. No.: 12/616,236

(22) Filed: Nov. 11, 2009

(65) Prior Publication Data
US 2010/0122041 A1 May 13, 2010

(30) Foreign Application Priority Data

Nov. 12, 2008 (JP) ................................. 2008-290387

(51) Int. Cl.
*G06F 12/00* (2006.01)
(52) U.S. Cl. ....................................... 711/147; 707/695
(58) Field of Classification Search .................. 711/147; 707/695
See application file for complete search history.

(56) References Cited

U.S. PATENT DOCUMENTS

| | | | | |
|---|---|---|---|---|
| 5,327,556 A | * | 7/1994 | Mohan et al. | 707/695 |
| 5,493,668 A | * | 2/1996 | Elko et al. | 711/130 |
| 2010/0010967 A1 | * | 1/2010 | Muller | 707/3 |

OTHER PUBLICATIONS

Harris, et al., "Abstract Nested Transactions", Transact, 2007, pp. 1-10.

* cited by examiner

*Primary Examiner* — Hashem Farrokh
(74) *Attorney, Agent, or Firm* — Vazken Alexanian (57) ABSTRACT

A memory control apparatus which controls access to a shared memory for each transaction. The apparatus includes a management unit that stores versions of data stored in the shared memory, a log storage unit that stores an update entry including a version of data subjected to an update operation in response to execution of an update operation on the shared memory in processing each transaction, and a control unit that writes a result of processing corresponding to execution of a relevant update operation to the shared memory when a request to commit a transaction has been given, and a relevant update entry version matches a corresponding version stored in the management unit, or re-executes the update operation and writes a result of re-execution to the shared memory when the update entry version does not match the corresponding version in the management unit.

13 Claims, 10 Drawing Sheets

| INDEX | VERSION | LOCK BIT |
|---|---|---|
| 0 × 00 | 3 | 0 |
| 0 × 01 | 11 | 0 |
| 0 × 02 | 89 | 1 |
| 0 × 03 | 3 | 1 |
| ⋮ | ⋮ | ⋮ |
| 0 × ff | 52 | 0 |

32

ADDRESS →

MEMORY CONTROL APPARATUS, PROGRAM, AND METHOD

CROSS REFERENCE TO RELATED APPLICATION

This application claims priority under 35 U.S.C. 119 from Japanese Patent Application 2008-290387, filed Nov. 12, 2008, the entire contents of which are incorporated herein by reference.

BACKGROUND OF THE INVENTION

1. Field of the Invention

The present invention relates to a memory control apparatus, a program, and a method for controlling access to a shared memory for each transaction.

2. Description of Related Art

In a computer system, multithreading is used. In multithreading, multiple threads perform multiple processes in parallel. In a computer system in which multithreading is used, when each of the multiple threads accesses a shared variable shared by the multiple threads, the thread and the other threads need to be synchronized. For example, exclusive control in which a lock is used is known as a synchronization method in multithreading. However, in exclusive control in which a lock is used, when an area in which processing is performed exclusively (i.e., a critical section) becomes large, the parallelism of processing by multithreading is impaired, and thus the performance is decreased.

A transactional memory is a synchronization mechanism for solving such a problem. In a transactional memory, a critical section is treated as a transaction, and memory access in the transaction is handled atomically. Specifically, in a transactional memory, memory access to a shared variable in a transaction is logged, and the change of the value of the shared variable in the transaction is made invisible to the other transactions until the transaction is committed. Then, in the transactional memory, any conflict of access to the shared variable is checked at the end of the transaction. When no conflict has occurred, the transaction is committed, and the change of the value of the shared variable is put into effect. When a conflict has occurred, the transaction is rolled back.

Figure 1:
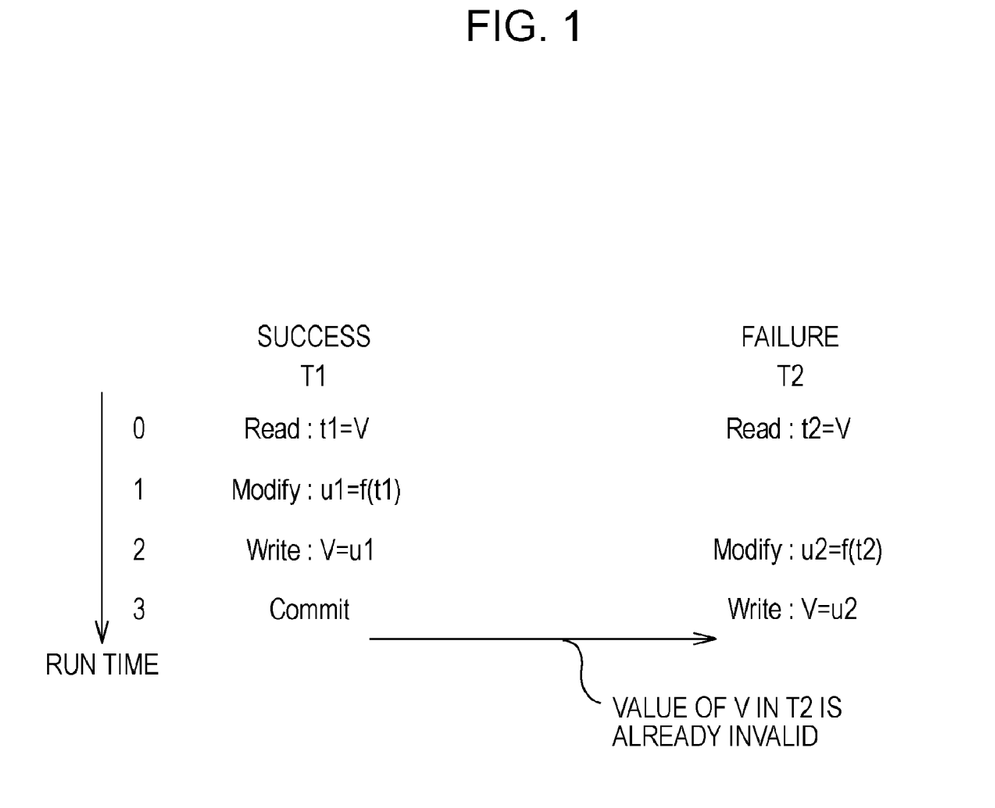
FIG. 1 shows the flow of a process in a case where two transactions T1 and T2 read, modify, and write the value of a shared variable V in parallel.

FIG. 1 shows the flow of processing in a case where two transactions T1 and T2 read, modify, and write the value of a shared variable V in parallel. For example, the change of the value of the shared variable V in the transaction T1 is committed, and the transaction T2 reads the value of the shared variable V, which has not been committed in the transaction T1. In this case, conflict of memory access to the shared variable V occurs between the transactions T1 and T2, and thus the commit of the transaction T2 fails. The transaction T2, the commit of which has failed, is rolled back. Specifically, the transaction T2 is re-executed after the state of memory access in the transaction T2 is rolled back to that at the start of the transaction T2.

See T. Harris and S. Stipic, "Abstract nested Transactions", TRANSACT 2007, at Internet URL http://www.cs.rochester.edu/meetings/TRANSACT07/papers/harris.pdf.

In such a transactional memory, when read-modify-write operations in which the value of a variable is read, and then the read value is written back after being subjected to an operation occur in a transaction, rollback may frequently occur. The larger the size of a transaction is, the heavier overhead due to rollback is. Thus, when a large-sized transaction includes read-modify-write operations, the execution efficiency of programs is decreased.

Harris and Stipic disclose a method in which, when the commit of a transaction has failed, the entire transaction need not be re-executed, as a method for preventing such a problem. In the method disclosed by them, a programmer sets an abstract nested transaction (ANT) block in code that constitutes a transaction. Then, the log of execution of the ANT block and the log of execution of part of the code other than the ANT block are separately obtained. When only memory access in the ANT block causes rollback, re-execution of only the ANT block is attempted. Then, the result of the initial execution is compared with the result of the re-execution. When the re-execution does not affect the result of execution of a program, the transaction is committed on the basis of the result of the re-execution.

However, in the method disclosed by Harris and Stipic, a programmer needs to specify points that cause rollback, for example, read-modify-write operations. Thus, when rollback frequently occurs due to read-modify-write operations in a library the source code of which does not exist, re-execution of the entire transaction cannot be prevented.

SUMMARY OF THE INVENTION

A first aspect of the present invention provides a memory control apparatus that controls access to a shared memory for each transaction. The memory control apparatus includes: a management unit that stores versions of pieces of data stored in the shared memory; a log storage unit that stores an update entry, including a version of data subjected to the update operation for the transaction, in response to execution of an update operation on the shared memory in processing of each transaction; and a control unit that, when a request to commit a transaction has been given, (i) writes a result of processing corresponding to execution of a relevant update operation to the shared memory if a version included in a relevant update entry matches a corresponding version of the versions stored in the management unit, and (ii) re-executes the update operation and writes a result of re-execution to the shared memory if the version included in the update entry does not match the corresponding version stored in the management unit.

According to another aspect of the present invention, a memory control apparatus that controls access to a shared memory for each transaction, the memory control apparatus includes: a management unit that manages versions of pieces of data stored in the shared memory for individual addresses; a log storage unit that stores an update entry, including an address in the shared memory of data updated in the update operation and a version of the data subjected to the update operation for the transaction, in response to execution of an update operation on the shared memory in processing of each transaction; and a control unit configured to: (i) write a result of processing corresponding to execution of a relevant update operation to an address in the shared memory included in the update entry, for each update entry stored in processing of the transaction when a version included in the update entry matches a corresponding version of the versions stored in the management unit; (ii) re-execute the update operation and write a result of re-execution to the address in the shared memory included in the update entry when the version included in the update entry does not match the corresponding version stored in the management unit; (iii) roll back the transaction without writing a result of re-execution to the shared memory for an update entry stored in the processing of the transaction when a version included in the update entry does not match a corresponding version of the versions stored in the management unit and a result of processing corresponding to execution of a relevant update operation has been read; and (iv) write overwritten data to the shared memory for each update entry stored in the processing of the transaction when a version included in the update entry does not match a corresponding version of the versions stored in the management unit and a result of processing of a relevant update operation has been overwritten in response to a write operation In accordance with still another aspect of the present invention, a computer program is provided that, when executed by a computer will cause the computer to act as a memory control apparatus as described above.

DETAILED DESCRIPTION OF PREFERRED EMBODIMENTS

The present invention will now be described via a preferred embodiment of the invention. The following embodiment does not restrict the invention claimed in the claims. All the combinations of features described in the embodiment are not necessarily mandatory for the problem-solving means of the present invention.

Figure 2:
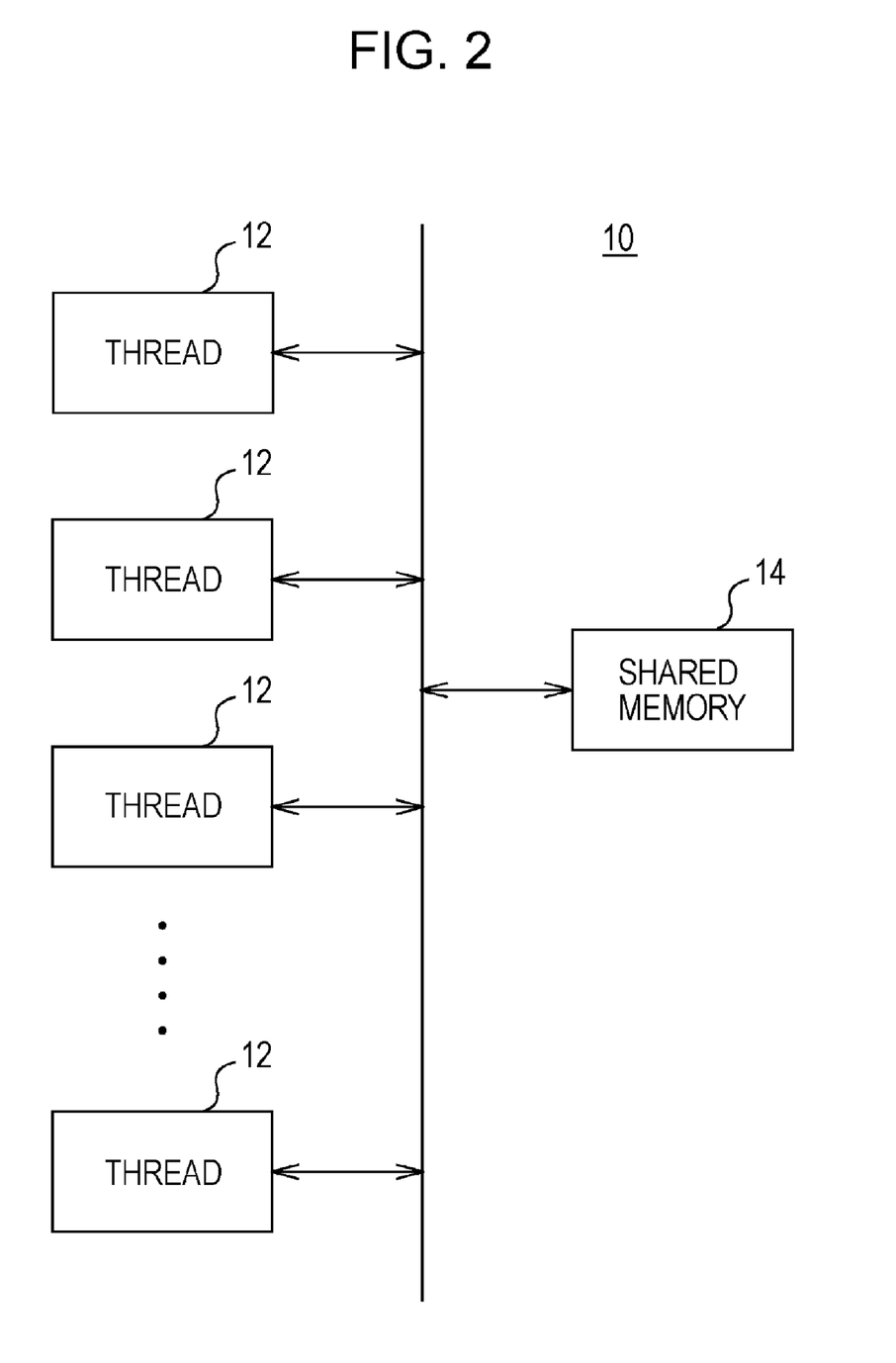
FIG. 2 shows components of a computer system 10 according to an embodiment of the present invention.

FIG. 2 shows components of a computer system 10 according to the embodiment. The computer system 10 includes multiple threads 12 and a shared memory 14. The multiple threads 12 are provided with respective processors and execute multiple programs in parallel. The shared memory 14 stores a shared variable accessed by the threads 12.

Each of the multiple threads 12 has the function of a transactional memory. Thus, the thread can access the shared memory 14 in synchronization with the other ones of the threads 12.

Figure 3:
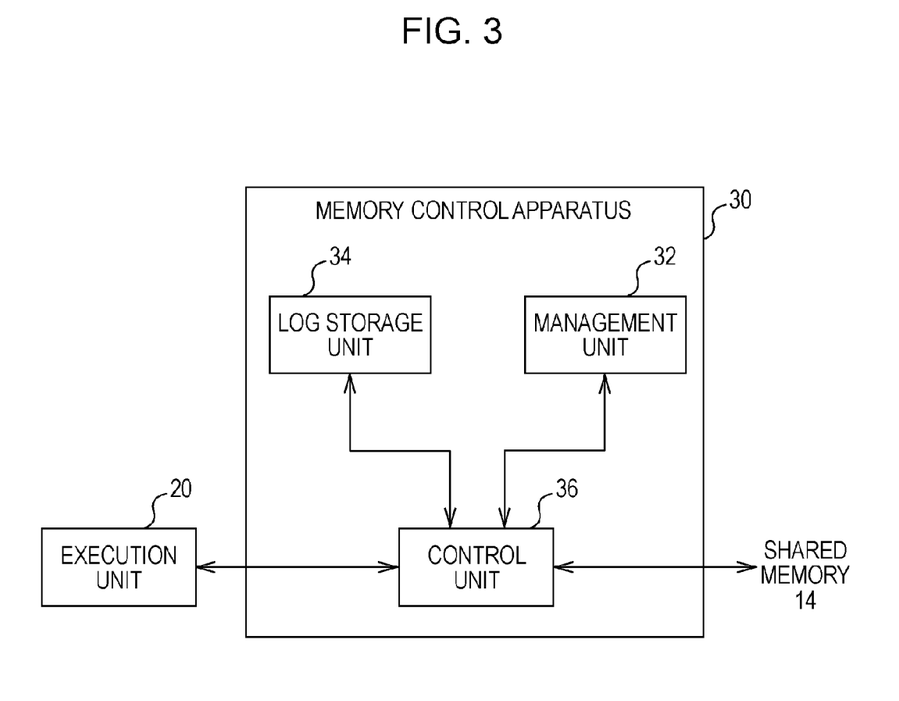
FIG. 3 shows the functional configuration of a memory control apparatus 30 according to the embodiment, together with a shared memory 14 and an execution unit 20.

FIG. 3 shows the functional configuration of a memory control apparatus 30 according to the embodiment, together with the shared memory 14 and an execution unit 20. The execution unit 20 is implemented by the processors in the threads 12 executing programs. The execution unit 20 performs an access operation on the shared memory 14. More specifically, the execution unit 20 performs a read operation of reading data stored in the shared memory 14 and a write operation of writing data to the shared memory 14. The execution unit 20 further performs an update operation of reading data stored in the shared memory 14 and writing back data obtained by performing a predetermined operation on the read data to the shared memory 14.

The memory control apparatus 30 implements the function of a transactional memory by controlling access to the shared memory 14 by the execution unit 20 for each transaction. The memory control apparatus 30 may be implemented individually by each of the multiple threads 12 or implemented by one of the multiple threads 12 as a common function of the computer system 10.

In this case, a transaction represents a unit in which multiple operations by the execution unit 20 are combined together. The processing of a transaction is completed by commit or rollback. When all operations in a first transaction can be completed without inconsistency, the memory control apparatus 30 performs a commit operation of reflecting the result of the processing in the shared memory 14. When inconsistency occurs in at least one of the operations in the first transaction, the memory control apparatus 30 requests the execution unit 20 to perform rollback and causes the execution unit 20 to re-execute the first transaction.

The memory control apparatus 30 includes a management unit 32, a log storage unit 34, and a control unit 36. The management unit 32 stores the respective versions of pieces of data stored in the shared memory 14. In this case, the management unit 32 manages the respective versions of pieces of data, achieving synchronization among multiple transactions executed in the computer system 10. For example, the management unit 32 stores a value that indicates a version in a memory accessed by the multiple threads 12 and manages the stored value by exclusive control in which a lock is used.

In response to execution of an update operation on the shared memory 14 in the processing of a transaction, the log storage unit 34 stores an update entry that includes the version of data subjected to the update operation for the transaction. More specifically, when an update operation is performed on the shared memory 14 in the processing of a transaction, the log storage unit 34 reads the version of data subjected to the update operation from the management unit 32. Then, the log storage unit 34 generates an update entry that includes the read version and stores the generated update entry in association with the transaction.

When the execution unit 20 has given a request to commit the transaction to the control unit 36, the control unit 36 determines whether the version included in the update entry matches a version stored in the management unit 32. When the version included in the update entry matches the version stored in the management unit 32, the control unit 36 writes the result of processing corresponding to the execution of the update operation to the shared memory 14. When the version included in the update entry does not match the version stored in the management unit 32, the control unit 36 re-executes the update operation and writes the result of the re-execution to the shared memory 14.

However, in the case where the request to commit the transaction has been given to the control unit 36, when the version included in the update entry does not match the version stored in the management unit 32 and when the result of processing corresponding to the execution of the update operation has been read, the control unit 36 rolls back the transaction without writing the result of re-execution to the shared memory 14. When the request to commit the transaction has been given to the control unit 36, when the version included in the update entry does not match the version stored in the management unit 32 and when the result of the update operation has been overwritten in response to another write operation, the control unit 36 writes overwritten data to the shared memory 14.

In this manner, even in a case where data subjected to an update operation in a transaction has been updated by an operation in another transaction in a period between execution of the update operation and commit, when execution of the update operation can be delayed until the time of commit, the memory control apparatus 30 re-executes the update operation at the time of commit. Thus, in the memory control apparatus 30, the execution efficiency of programs can be improved by preventing re-execution of the entire transaction.

Figure 4:
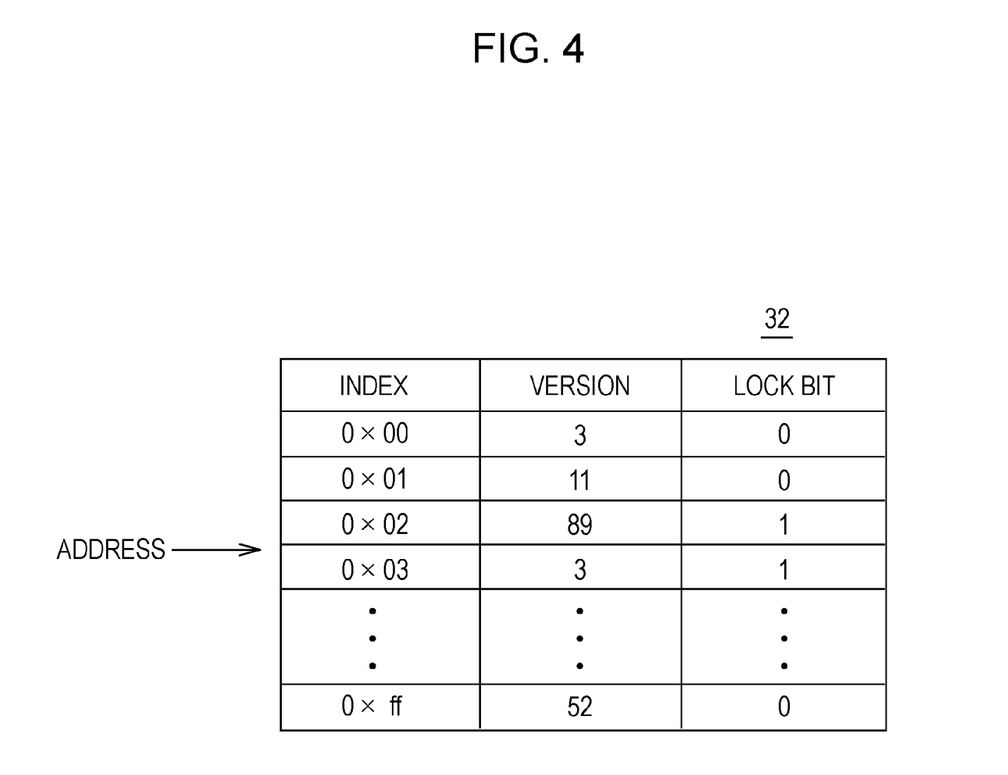
FIG. 4 shows an example of data stored in a management unit 32.

FIG. 4 shows an example of data stored in the management unit 32. For example, the management unit 32 may manage the version of data stored in the shared memory 14 for each address in the shared memory 14.

For example, the management unit 32 may store a table that include "index", "version", and "lock bit" as headings, as shown in FIG. 4. A value that indicates an address in the shared memory 14 is stored as an index.

A value that indicates the version of data stored at a corresponding address is stored as a version. For example, an integer value that is cyclically incremented or decremented by one in a range from the initial value (for example, 0) to the last value (for example, 1023) may be stored as a version. A bit value for performing exclusive control of updating of a version in a corresponding row is stored as a lock bit. The management unit 32 can manage the version of data stored in the shared memory 14 for each address in the shared memory 14 by storing such a table.

In this case, the management unit 32 may manage the version of data for the value of lower-order bits of each address. In this case, since the management unit 32 manages the respective versions of multiple pieces of data that have the same lower-order bits in the respective addresses together, a demerit such that the probability that a mismatch between versions occurs at the time of commit increases is produced. However, a merit such that the necessary storage capacity can be reduced is produced.

Figure 5:
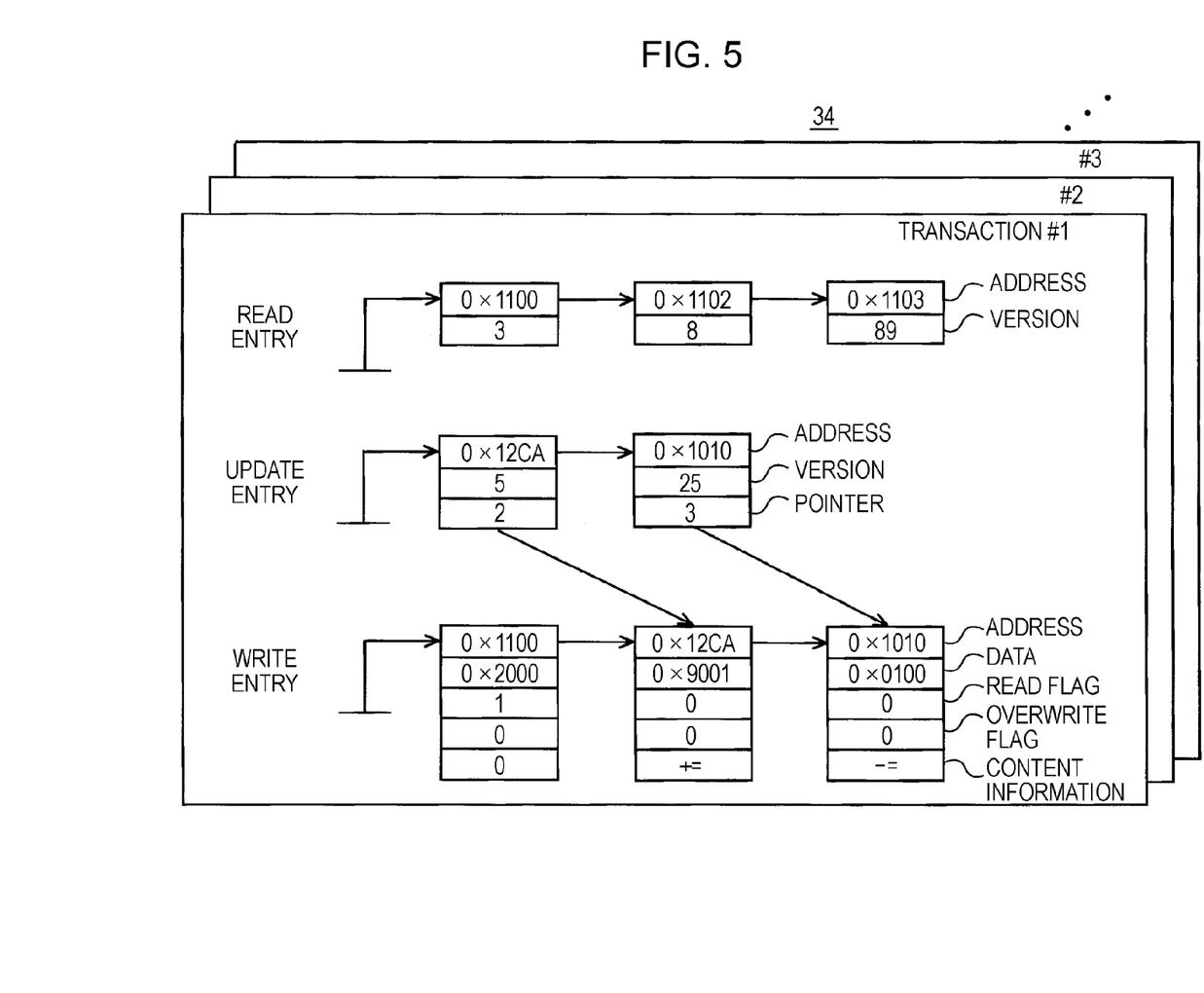
FIG. 5 shows exemplary structure of data stored in a log storage unit 34.

FIG. 5 shows exemplary structure of data stored in the log storage unit 34. The log storage unit 34 stores read entries, update entries, and write entries for each transaction.

In particular, in response to execution of a read operation and an update operation on the shared memory 14 in the processing of a transaction, the log storage unit 34 stores read entries for the transaction. In this case, the log storage unit 34 stores, in each read entry, the address, in the shared memory 14, of data read in the read operation or the update operation and the version of the data read in the read operation or the update operation.

In response to execution of an update operation on the shared memory 14 in the processing of a transaction, the log storage unit 34 stores update entries for the transaction. In this case, the log storage unit 34 stores, in each update entry, the address, in the shared memory 14, of data updated in the update operation, the version of the data updated in the update operation, and a pointer to a write entry that includes the result of the update operation.

In response to execution of a write operation and an update operation on the shared memory 14 in the processing of a transaction, the log storage unit 34 stores write entries for the transaction. In this case, the log storage unit 34 stores, in each write entry, an address, data, a read flag, an overwrite flag, and content information.

An address included in the write entry is the address, in the shared memory 14, of data written in the write operation or the update operation. Data included in the write entry is data written to the shared memory 14 in the write operation or data that is the result of the update operation written to the shared memory 14 in the update operation.

A read flag included in the write entry is a flag indicating that the data included in the write entry has been read. An overwrite flag included in the write entry is a flag indicating that the data in the write entry has been written in response to an operation other than an update operation.

Content information included in the write entry is information indicating the content of the update operation. For example, the log storage unit 34 stores, as content information, information for identifying an operation of reading a value and writing back the value after incrementing it by one, an operation of reading a value and writing back the value after decrementing it by one, an operation of reading a value and writing back the value after adding a constant to the value, or an operation of reading a value and writing back the value after multiplying the value by a constant.

In this case, in execution of an update operation on the shared memory 14 in the processing of a transaction, when the address, in the shared memory 14, of data updated in the update operation is already included in a write entry, the log storage unit 34 does not store any new update entry corresponding to the update operation. Then, in this case, the log storage unit 34 stores the result of the update operation in the write entry, which includes the address, in the shared memory 14, of the data updated in the update operation.

Figure 6:
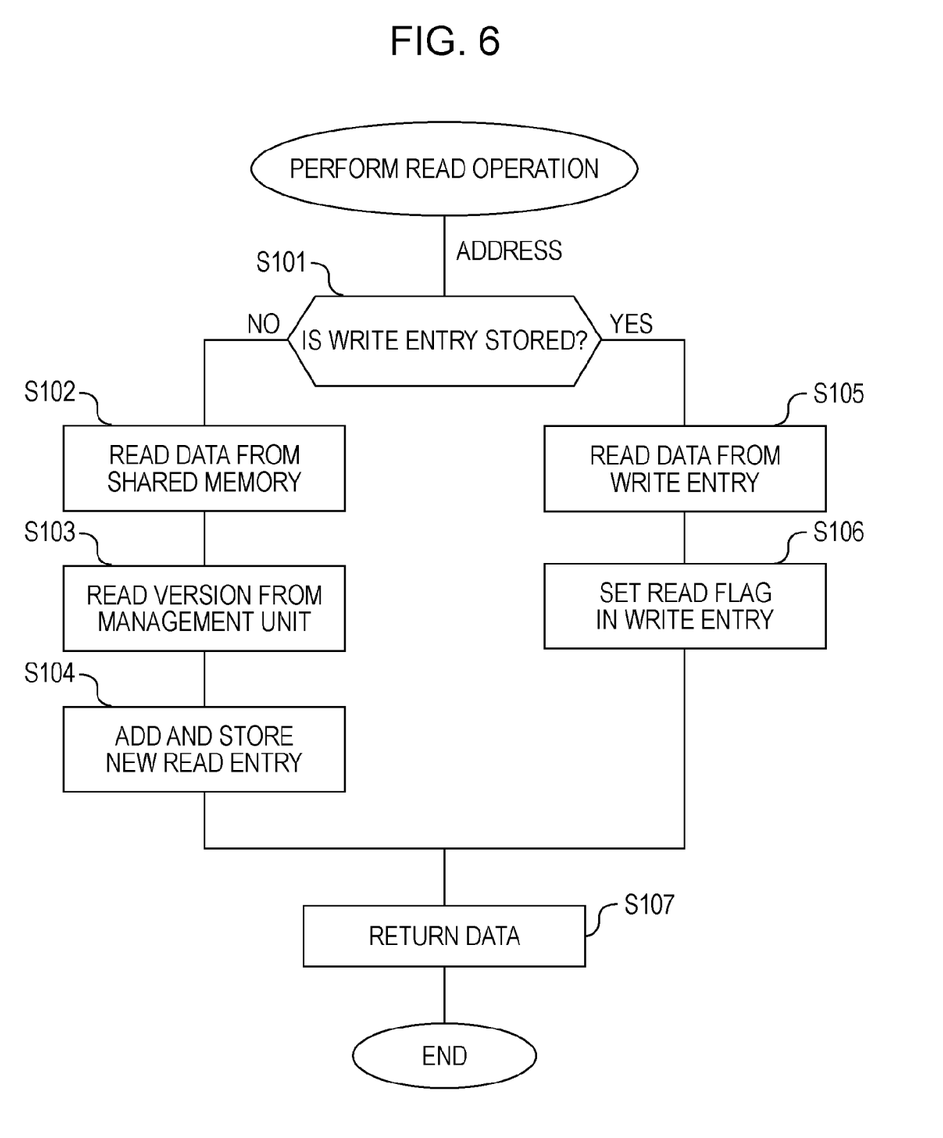
FIG. 6 shows the flow of a process performed by the memory control apparatus 30 in execution of a read operation on the shared memory 14 in the processing of a transaction by the execution unit 20.

FIG. 6 shows the flow of a process performed by the memory control apparatus 30 in execution of a read operation on the shared memory 14 in the processing of a transaction by the execution unit 20. In response to execution of a read operation on the shared memory 14 in the processing of a transaction by the execution unit 20, the control unit 36 in the memory control apparatus 30 receives, from the execution unit 20, the address, in the shared memory 14, of data to be read in the read operation. Then, the control unit 36 determines whether the received address is included in a write entry stored in the log storage unit 34, the write entry corresponding to the transaction (S101). That is, the control unit 36 determines whether the data to be read in the read operation is data written by a write operation preceding the read operation in the processing of the transaction.

When the address, in the shared memory 14, of the data to be read in the read operation is not included in any write entry corresponding to the transaction (NO in S101), the control unit 36 reads the data from the shared memory 14 (S102). Then, the control unit 36 reads, from the management unit 32, the version of the data read from the shared memory 14 (S103). Then, the control unit 36 adds a new read entry that includes the address in the shared memory 14 and version of the read data and causes the log storage unit 34 to store the new read entry (S104).

On the other hand, when the address, in the shared memory 14, of the data to be read in the read operation is included in a write entry corresponding to the transaction (YES in S101), the control unit 36 reads the data from the write entry (S105). Then, the control unit 36 sets a read flag in the write entry (S106).

After processing in step S104 or S106 is completed, the control unit 36 returns, to the execution unit 20, the data read from the shared memory 14 or the write entry (S107). After processing in step S107 is completed, the control unit 36 completes the process in response to the read operation. The control unit 36 performs processing in steps S101 to S107 every time a read operation is performed in the execution unit 20.

Figure 7:
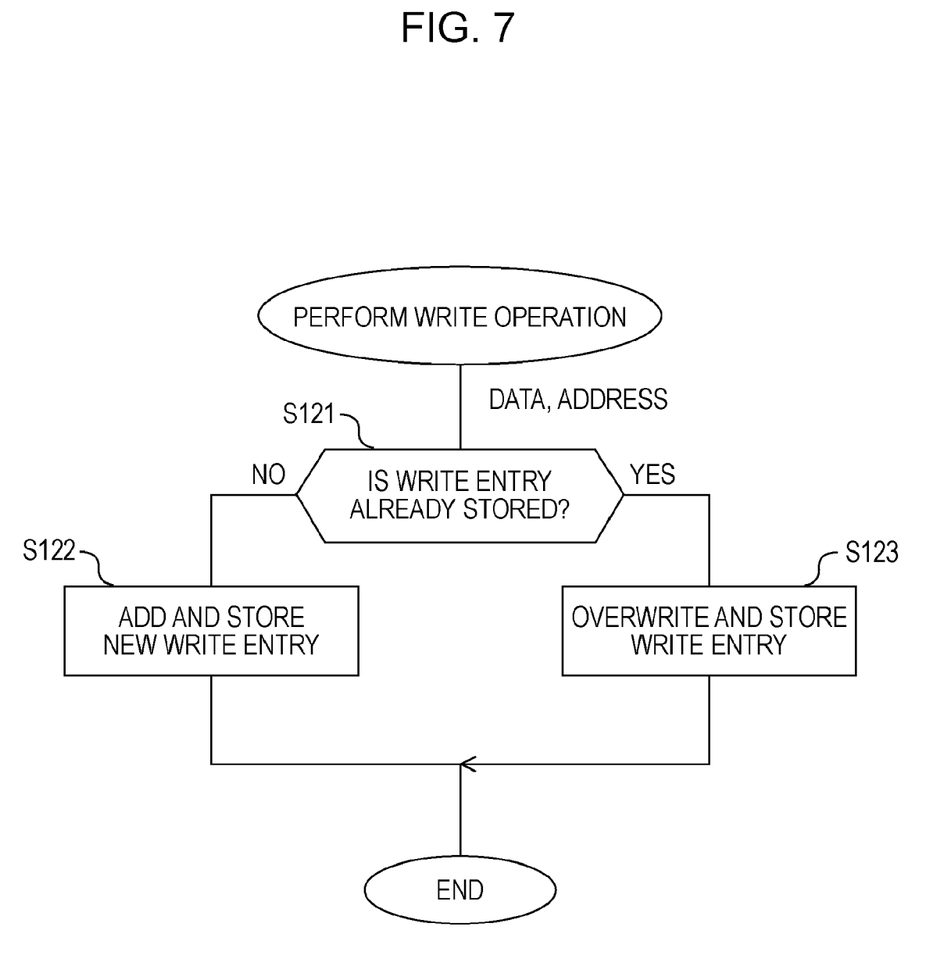
FIG. 7 shows the flow of a process performed by the memory control apparatus 30 in execution of a write operation on the shared memory 14 in the processing of a transaction by the execution unit 20.

FIG. 7 shows the flow of a process performed by the memory control apparatus 30 in execution of a write operation on the shared memory 14 in the processing of a transaction by the execution unit 20. In response to execution of a write operation on the shared memory 14 in the processing of a transaction by the execution unit 20, the control unit 36 in the memory control apparatus 30 receives, from the execution unit 20, data to be written to the shared memory 14 in the write operation and the address in the shared memory 14. Then, the control unit 36 determines whether the received address is included in a write entry stored in the log storage unit 34, the write entry corresponding to the transaction (S121). That is, the control unit 36 determines whether data written preceding the write operation in the processing of the transaction is overwritten with the new data.

When the address in the shared memory 14, to which the data is written in the write operation, is not included in any write entry corresponding to the transaction (NO in S121), the control unit 36 adds a new write entry and causes the log storage unit 34 to store the new write entry (S122). On the other hand, when the address in the shared memory 14, to which the data is written in the write operation, is included in a write entry corresponding to the transaction (YES in S121), the control unit 36 does not add any new write entry and causes the log storage unit 34 to overwrite and store the write entry (S123).

In this case, when the write operation is an operation associated with an update operation, the log storage unit 34 puts an address, data, and content information in the write entry and does not put a read flag and an overwrite flag in the write entry, and then the log storage unit 34 stores the write entry. When the write operation is an operation that is not associated with an update operation, the log storage unit 34 puts an address, data, and an overwrite flag in the write entry and does not put a read flag and content information in the write entry, and then the log storage unit 34 stores the write entry.

After processing in step S122 or S123 is completed, the control unit 36 completes the process in response to the write operation. The control unit 36 performs processing in steps S121 to S123 every time a write operation is performed in the execution unit 20.

Figure 8:
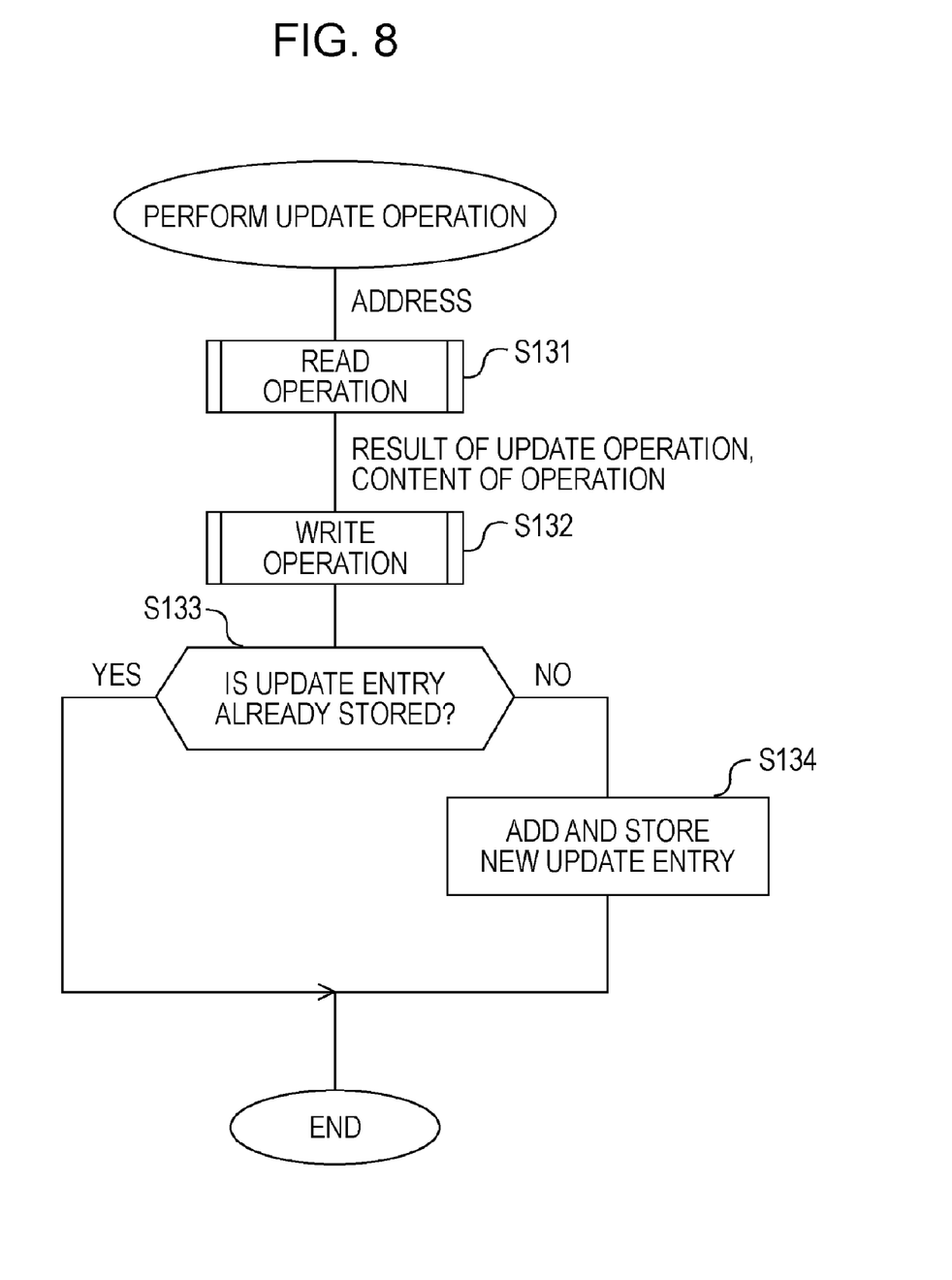
FIG. 8 shows the flow of a process performed by the memory control apparatus 30 in execution of an update operation on the shared memory 14 in the processing of a transaction by the execution unit 20.

FIG. 8 shows the flow of a process performed by the memory control apparatus 30 in execution of an update operation on the shared memory 14 in the processing of a transaction by the execution unit 20. In response to execution of an update operation on the shared memory 14 in the processing of a transaction by the execution unit 20, the control unit 36 in the memory control apparatus 30 receives, from the execution unit 20, the address, in the shared memory 14, of data to be read in the update operation. Then, the control unit 36 performs an operation similar to the read operation shown in steps S101 to S107 in FIG. 6 (S131). The execution unit 20 performs, on the data read in step S131, a calculation for the update operation such as increment or decrement.

Then, the control unit 36 receives, from the execution unit 20, the result of performing the calculation for the update operation. The control unit 36 also receives, from the execution unit 20, the content of the update operation. Then, the control unit 36 performs an operation similar to the write operation shown in steps S121 to S123 in FIG. 7 (S132).

Then, the control unit 36 determines whether a received address is included in any update entry stored in the log storage unit 34, the update entry corresponding to the transaction (S133). When the address in the shared memory 14, to which data is written in the update operation, is not included in any update entry corresponding to the transaction (NO in S133), the control unit 36 causes the log storage unit 34 to add and store a new update entry that includes an address, a version, and a pointer (S134). Then, the control unit 36 completes the update operation.

On the other hand, when the address in the shared memory 14, to which the data is written in the update operation, is included in an update entry corresponding to the transaction (YES in S133), the control unit 36 completes the process without adding any new update entry. The control unit 36 performs processing in steps S131 to S134 every time an update operation is performed in the execution unit 20.

Figure 9:
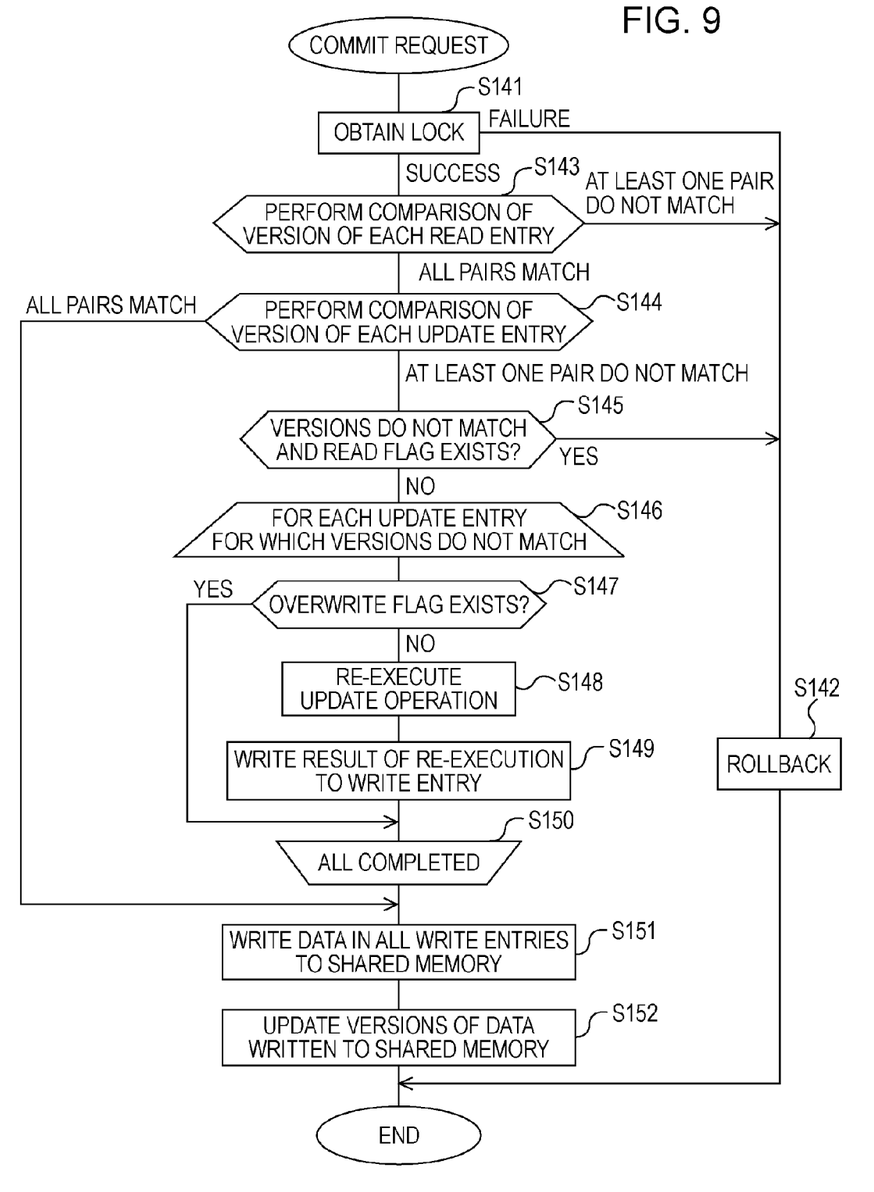
FIG. 9 shows the flow of a process performed by the memory control apparatus 30 when a request to commit a transaction is given from the execution unit 20.

FIG. 9 shows the flow of a process performed by the memory control apparatus 30 when a request to commit a transaction is given from the execution unit 20. When a request to commit a transaction has been given from the execution unit 20, the control unit 36 in the memory control apparatus 30 performs processing in the following steps 141 to S152.

When the request to commit the transaction has been given, the control unit 36 reads addresses including all stored write entries corresponding to the transaction and obtains locks for the read addresses (S141). Thus, the control unit 36 can prohibit updating of data by another transaction on these addresses.

In this case, when the control unit 36 cannot obtain a lock for any one of the read addresses, the control unit 36 will roll back the processing of the transaction by the execution unit 20 to a state at the start of the transaction and complete the process (S142). In this arrangement, when data to be written in the processing of the transaction has been updated by another transaction, the control unit 36 will roll back the transaction and then re-execute it. Thus, synchronization can be achieved between the transaction and the other transaction.

When the control unit 36 has obtained the locks, for each of the read entries stored in the processing of the transaction, the control unit 36 compares a version included in the read entry with a version stored in the management unit 32 corresponding to an address included in the read entry (S143). When at least one of the versions included in the read entries does not match a corresponding one of the versions stored in the management unit 32, the control unit 36 will roll back the processing of the transaction by the execution unit 20 to the state at the start of the transaction and complete the process (S142). In this arrangement, when data read in the processing of the transaction has been updated by another transaction, the control unit 36 will roll back the transaction and then re-execute the transaction. Thus, the consistency of the data can be maintained.

When the versions included in the read entries exactly match the versions stored in the management unit 32, the control unit 36 causes the process to proceed to step S144. In step S144, for each of the update entries stored in the processing of the transaction, the control unit 36 compares a version included in the update entry with a version stored in the management unit 32 corresponding to an address included in the update entry (S144). When the versions included in the update entries exactly match versions stored in the management unit 32, the control unit 36 causes the process to proceed to step S151.

When at least one of the versions included in the update entries does not match a corresponding one of the versions stored in the management unit 32, the control unit 36 causes the process to proceed to step S145. In step S145, for each of the update entries stored in the processing of the transaction, the control unit 36 determines whether a version included in the update entry does not match a corresponding version stored in the management unit 32 and a write entry indicated by a pointer included in the update entry includes a read flag (S145). When, for at least one of the update entries, a version included in the update entry does not match a corresponding version stored in the management unit 32 and a write entry indicated by a pointer includes a read flag, the control unit 36 rolls back the processing of the transaction by the execution unit 20 to the state at the start of the transaction and completes the process (S142). In this arrangement, when the result of performing an update operation has been read in the transaction and when data that needs to be subjected to the update operation has been updated by another transaction, the control unit 36 will roll back the transaction and then re-execute the transaction. Thus, the consistency of the data can be maintained.

When, for each of the update entries, a version included in the update entry matches a corresponding version stored in the management unit 32 or a write entry indicated by a pointer does not include a read flag, the control unit 36 causes the process to proceed to step S146. For each of the update entries stored in the processing of the transaction, the control unit 36 performs processing in steps S147 to S149 (S146, S150).

In step S147, the control unit 36 determines whether a write entry indicated by a pointer included in the update entry includes an overwrite flag (S147). When the write entry indicated by the pointer included in the update entry does not include any overwrite flag (NO in S147), the control unit 36 re-executes a corresponding update operation (S148). In this case, the control unit 36 re-executes an update operation corresponding to content information in a write entry indicated by a pointer included in an update entry corresponding to the update operation subjected to re-execution. Then, the control unit 36 overwrites, with the result of re-executing the update operation, data in the write entry indicated by the pointer included in the update entry corresponding to the update operation subjected to re-execution (S149).

When the write entry indicated by the pointer included in the update entry includes an overwrite flag (YES in S147), the control unit 36 does not re-execute the update operation corresponding to the update entry. As described above, when a write entry indicated by a pointer included in a corresponding update entry does not include any overwrite flag and when a version included in the update entry does not match a corresponding version stored in the management unit 32, the control unit 36 can re-execute a corresponding update operation.

When, for each of the update entries stored in the processing of the transaction, the control unit 36 completes the processing in steps S147 to S149, the control unit 36 causes the process to proceed to step S151. In step S151, the control unit 36 writes data included in each of the write entries corresponding to the transaction to an address in the shared memory 14 included in the write entry (S151).

Then, the control unit 36 updates the version of the data written to the shared memory 14 (S152). For example, the control unit 36 reads a version corresponding to an address included in an update entry from the management unit 32 and writes the read value back to the management unit 32 after, for example, incrementing the value by one.

In this manner, even in a case where data subjected to an update operation in a transaction has been updated in a period between execution of the update operation and commit, so that versions do not match, when execution of the update operation can be delayed until the time of commit, the memory control apparatus 30 re-executes the update operation at the time of commit. Thus, in the memory control apparatus 30, the execution efficiency of programs can be improved by preventing re-execution of the entire transaction.

Figure 10:
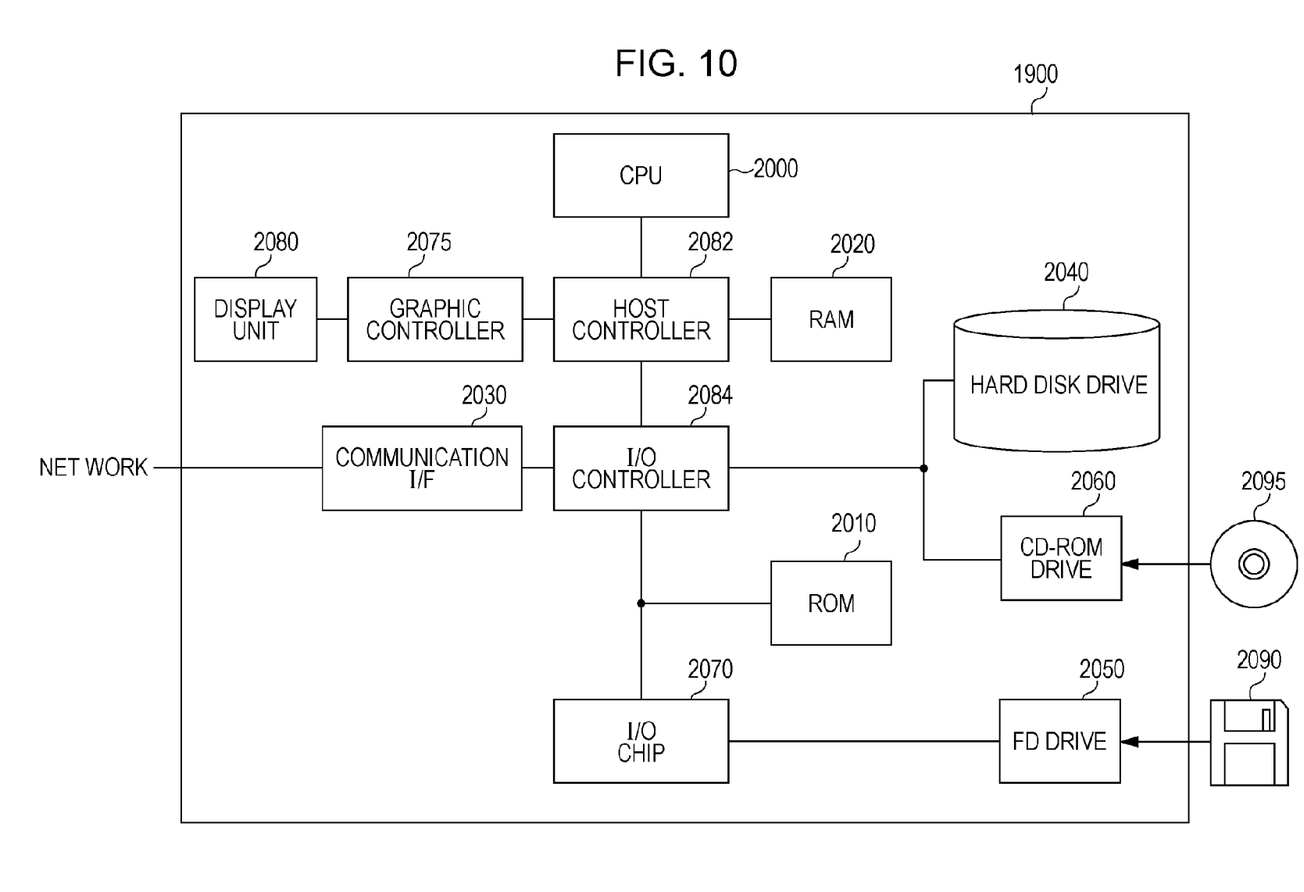
FIG. 10 shows an exemplary hardware configuration of a computer 1900 according to the embodiment of the present invention.

FIG. 10 shows an exemplary hardware configuration of a computer 1900 according to the embodiment. The computer 1900 according to the embodiment includes a CPU peripheral section that includes a CPU 2000, a RAM 2020, a graphic controller 2075, and a display unit 2080 connected to each other via a host controller 2082, an input-output section that includes a communication interface 2030, a hard disk drive 2040, and a CD-ROM drive 2060 connected to the host controller 2082 via an input-output controller 2084, and a legacy input-output section that includes a ROM 2010, a flexible disk drive 2050, and an input-output chip 2070 connected to the I/O controller 2084.

The host controller 2082 connects the RAM 2020 to the CPU 2000 and the graphic controller 2075, which access the RAM 2020 at a high transfer rate. The CPU 2000 operates on the basis of programs stored in the ROM 2010 and the RAM 2020 and controls individual components. The graphic controller 2075 obtains image data generated in a frame buffer provided in the RAM 2020 by, for example, the CPU 2000 and displays the image data on the display unit 2080. Alternatively, the graphic controller 2075 may include a frame buffer for storing image data generated by, for example, the CPU 2000.

The input-output controller 2084 connects the host controller 2082 to the communication interface 2030, the hard disk drive 2040, and the CD-ROM drive 2060, which are relatively high-speed input-output units. The communication interface 2030 communicates with another apparatus via a network. The hard disk drive 2040 stores programs and data used by the CPU 2000 in the computer 1900. The CD-ROM drive 2060 reads programs or data from a CD-ROM 2095 and supplies the programs or data to the hard disk drive 2040 via the RAM 2020.

The ROM 2010, the flexible disk drive 2050, and the input-output chip 2070, which are relatively low-speed input-output units, are connected to the input-output controller 2084. The ROM 2010 stores a boot program that is executed when the computer 1900 is activated and/or, for example, programs that depend on the hardware of the computer 1900. The flexible disk drive 2050 reads programs or data from a flexible disk 2090 and supplies the programs or data to the hard disk drive 2040 via the RAM 2020. The input-output chip 2070 connects the flexible disk drive 2050 to the input-output controller 2084 and connects various types of input-output units to the input-output controller 2084 via, for example, a parallel port, a serial port, a keyboard port, and a mouse port.

Programs to be supplied to the hard disk drive 2040 via the RAM 2020 are stored in a recording medium, for example, the flexible disk 2090, the CD-ROM 2095, or an IC card, and supplied to users. The programs are read from the recording medium, installed in the hard disk drive 2040 in the computer 1900 via the RAM 2020, and executed in the CPU 2000.

Programs installed in the computer 1900 to cause the computer 1900 to function as the memory control apparatus 30 include a management module, a log storage module, and a control module. The programs or modules work, for example, the CPU 2000 so as to cause the computer 1900 to function as the management unit 32, the log storage unit 34, and the control unit 36.

The information processing described in the programs is read by the computer 1900 to function as the management unit 32, the log storage unit 34, and the control unit 36, which are concrete means in which software and the aforementioned various types of hardware resources cooperate with each other. Then, calculation or processing of information specific to an intended use by the computer 1900 according to the embodiment is implemented by the concrete means to construct the memory control apparatus 30 specific to the intended use.

For example, when the computer 1900 communicates with, for example, an external apparatus, the CPU 2000 executes a communication program loaded into the RAM 2020 to indicate to the communication interface 2030 to perform communication processing according to the content of processing described in the communication program. The communication interface 2030 reads, under the control of the CPU 2000, transmit data stored in, for example, a transmit buffer area provided in a storage unit, such as the RAM 2020, the hard disk drive 2040, the flexible disk 2090, or the CD-ROM 2095, and transmits the transmit data to the network. The communication interface 2030 further writes receive data received from the network to, for example, a receive buffer area provided in the storage unit. The communication interface 2030 may perform transfer of transmit and receive data from and to the storage unit by the direct memory access (DMA) method in this manner. Alternatively, the CPU 2000 may read data from the storage unit or the communication interface 2030, which is a source, and then write the data to the communication interface 2030 or the storage unit, which is a destination, so as to perform transfer of transmit and receive data.

The CPU 2000 causes all or a necessary part of, for example, a file or a database stored in an external storage unit, such as the hard disk drive 2040, the CD-ROM drive 2060 (the CD-ROM 2095), or the flexible disk drive 2050 (the flexible disk 2090), to be read into the RAM 2020 by, for example, DMA transfer. Then, the CPU 2000 performs various types of processing on the data in the RAM 2020. Then, the CPU 2000 writes the data having been processed back to the external storage unit by, for example, DMA transfer. In such processing, since the RAM 2020 can be considered to temporarily store the content in the external storage unit, in the embodiment, the RAM 2020, the external storage unit, and the like are collectively called, for example, a memory, a storage, or a storage unit. Various types of programs and various types of information such as data, tables, and a database in the embodiment are stored in such a storage unit and subjected to information processing. In this case, the CPU 2000 may store a part of data in the RAM 2020 in a cache memory and perform read and write operations on the cache memory. Even in such a case, since the cache memory undertakes some of the functions of the RAM 2020, in the embodiment, it is assumed that the cache memory is included in the RAM 2020, a memory, and/or a storage unit, except where distinguished.

The CPU 2000 performs, on data read from the RAM 2020, various types of processing specified by a string of instructions in a program, the various types of processing including, for example, various types of calculation, processing of information, condition determination, and retrieval and replacement of information described in the embodiment. Then, the CPU 2000 writes the processed data back to the RAM 2020. For example, when the CPU 2000 performs condition determination, the CPU 2000 compares each of the various types of variables shown in the embodiment with another variable or a constant and determines whether a condition is satisfied. The condition includes, for example, the variable is more than the other variable or the constant, the variable is less than the other variable or the constant, the variable is equal to or more than the other variable or the constant, the variable is equal to or less than the other variable or the constant, and the variable is equal to the other variable or the constant. When the condition is satisfied, or is not satisfied, the process branches to a different string of instructions, or a subroutine is called.

The CPU 2000 can search for information stored in, for example, a file or a database in a storage unit. For example, when a plurality of entries in each of which the attribute value of a first attribute is associated with the attribute value of a second attribute are stored in a storage unit, the CPU 2000 can obtain the attribute value of the second attribute associated with the attribute value of the first attribute that satisfies a predetermined condition by searching for an entry in which the attribute value of the first attribute satisfies the predetermined condition in the plurality of entries stored in the storage unit and reading the attribute value of the second attribute stored in the entry.

The programs or modules which have been described may be stored in an external recording medium. Besides the flexible disk 2090 and the CD-ROM 2095, for example, an optical recording medium such as a DVD or a CD, a magneto-optical recording medium such as an MO, a tape medium, or a semiconductor memory such as an IC card may be used as a recording medium. A storage unit, such as a hard disk or a RAM, provided in a server system connected to a private communication network or the Internet may be used as a recording medium, and the programs may be supplied to the computer 1900 via the network.

While the present invention has been described using the embodiment, the technical scope of the present invention is not limited to the description of the aforementioned embodiment. It is obvious to persons skilled in the art that various changes or improvements can be made in the aforementioned embodiment. It is obvious from the description of the claims that the embodiment, in which such changes or improvements are made, is also covered by the technical scope of the present invention.

It should be noted that, regarding the execution sequence of processes, for example, operations, procedures, steps, and stages in the apparatuses, the systems, the programs, and the methods described in the claims and the specification, expression such as "before" and "preceding" is not explicitly given, and the apparatuses, the systems, the programs, and the methods can be implemented with any sequence of processes unless the output of a preceding step is used by a following step. Even when operation flows in the claims, the specification, and the drawings are described using expression such as "first" and "next" for the sake of simplicity, this does not mean that such sequence is required.

We claim:

1. A memory control apparatus which controls access to a shared memory for each transaction, the memory control apparatus comprising:
   a management unit that stores versions of data stored in the shared memory;
   a log storage unit that stores an update entry, including a version of data subjected to the update operation for the transaction, in response to execution of an update operation on the shared memory in processing of each transaction; and
   a control unit which when a request to commit a transaction has been given (i) writes a result of processing corresponding to execution of a relevant update operation to the shared memory if a version included in a relevant update entry matches a corresponding version of the versions stored in the management unit, and (ii) re-executes the update operation on the shared memory and writes a result of re-execution to the shared memory if the version included in the update entry does not match the corresponding version stored in the management unit.

2. The memory control apparatus according to claim 1, wherein, when a request to commit a transaction has been given, the control unit rolls back the transaction without writing a result of re-execution to the shared memory if a version included in a relevant update entry does not match a corresponding version of the versions stored in the management unit and a result of processing corresponding to execution of a relevant update operation has been read.

3. The memory control apparatus according to claim 1, wherein, if a request to commit a transaction has been given, the control unit writes overwritten data to the shared memory if a version included in a relevant update entry does not match a corresponding version of the versions stored in the management unit and a result of processing of a relevant update operation has been overwritten in response to a write operation.

4. The memory control apparatus according to claim 1, wherein:
the management unit manages the versions of the data stored in the shared memory for individual addresses;
the log storage unit stores each update entry, wherein the update entry includes (i) an address in the shared memory of data updated in a relevant update operation and (ii) a version of the data updated in the update operation; and
if a request to commit a transaction has been given, for each update entry stored in processing of the transaction, the control unit (i) writes a result of processing corresponding to execution of a relevant update operation to an address in the shared memory included in the update entry if a version included in the update entry matches a corresponding version of the versions stored in the management unit, and (ii) writes a result of re-execution to the address in the shared memory included in the update entry if the version included in the update entry does not match the corresponding version stored in the management unit.

5. The memory control apparatus according to claim 4, wherein the log storage unit stores for the transaction:
a read entry that includes an address in the shared memory of data read in the read operation and a version of the data read in the read operation in response to execution of a read operation on the shared memory in processing of each transaction;
a write entry that includes an address in the shared memory of data written in the write operation and the data written to the shared memory in the write operation in response to execution of a write operation on the shared memory in processing of each transaction;
a read entry that includes an address in the shared memory of data read in the update operation and a version of the data read in the update operation in response to execution of an update operation on the shared memory in processing of each transaction; and
a write entry that includes an address, in the shared memory, of data written in the update operation and the data, which is a result of processing of the update operation, written to the shared memory in the update operation in response to execution of update operation on the shared memory in processing of each transaction.

6. The memory control apparatus according to claim 5, wherein:
the log storage unit stores a result of the update operation in the write entry which includes the address in the shared memory of the data updated in the update operation, without storing a new update entry corresponding to the update operation when an address in the shared memory of data updated in the update operation is already included in a write entry.

7. The memory control apparatus according to claim 6, wherein:
the log storage unit stores each update entry, putting in the update entry a pointer to a write entry that includes a result of processing of a relevant update operation; and
the control unit: (i) re-executes a relevant update operation for each update entry stored in processing of the transaction when a version included in the update entry does not match a corresponding version of the versions stored in the management unit; (ii) writes, in an overwrite mode, a result of re-executing the update operation to a write entry indicated by a pointer included in the update entry corresponding to the update operation to be re-executed; and (iii) writes data included in each write entry corresponding to the transaction to an address in the shared memory included in the write entry.

8. The memory control apparatus according to claim 7, wherein:
the log storage unit stores a write entry that includes a result of processing of an update operation, putting in the write entry content information that indicates content of the update operation; and
the control unit re-executes an update operation corresponding to content information in a write entry indicated by a pointer included in an update entry corresponding to an update operation to be re-executed.

9. The memory control apparatus according to claim 7, wherein:
the log storage unit stores each write entry, putting in the write entry a read flag that indicates that data included in the write entry has been read;
the control unit reads the data from the shared memory in response to execution of a read operation on the shared memory in processing of a transaction, when an address in the shared memory of data read in the read operation is not included in any write entry corresponding to the transaction, and the control unit reads data from the write entry and sets a read flag in the write entry when the address is included in a write entry; and
the control unit rolls back the transaction without writing data included in the write entry to the shared memory when (i) a request to commit a transaction has been given for an update entry stored in processing of the transaction; (ii) a version included in the update entry does not match a corresponding version of the versions stored in the management unit; and (iii) a write entry indicated by a pointer included in the update entry includes a read flag.

10. The memory control apparatus according to claim 7, wherein:
the log storage unit stores each write entry, putting in the write entry an overwrite flag that indicates that data in the write entry has been written in response to an operation other than an update operation; and
the control unit writes data included in the write entry to an address in the shared memory included in the write entry without re-executing an update operation corresponding to the update entry for each update entry stored in processing of the transaction when a write entry indicated by a pointer included in the update entry includes an overwrite flag.

11. An article of manufacture comprising a computer program tangibly embodied in a storage medium, said computer program, when executed by a computer, causing the computer to function as a memory control apparatus in accordance with claim 1.

12. A memory control apparatus that controls access to a shared memory for each transaction, the memory control apparatus comprising:
   a management unit that manages versions of data stored in the shared memory for individual addresses;
   a log storage unit that stores an update entry, including an address in the shared memory of data updated in the update operation and a version of the data subjected to the update operation for the transaction, in response to execution of an update operation on the shared memory in processing of each transaction; and
   a control unit configured to: (i) write a result of processing corresponding to execution of a relevant update operation to an address in the shared memory included in the update entry, for each update entry stored in processing of the transaction when a version included in the update entry matches a corresponding version of the versions stored in the management unit; (ii) re-execute the update operation on the shared memory and write a result of re-execution to the address in the shared memory included in the update entry when the version included in the update entry does not match the corresponding version stored in the management unit; (iii), roll back the transaction without writing a result of re-execution to the shared memory for an update entry stored in the processing of the transaction when a version included in the update entry does not match a corresponding version of the versions stored in the management unit and a result of processing corresponding to execution of a relevant update operation has been read; and (iv) write overwritten data to the shared memory for each update entry stored in the processing of the transaction when a version included in the update entry does not match a corresponding version of the versions stored in the management unit and a result of processing of a relevant update operation has been overwritten in response to a write operation.

13. An article of manufacture comprising a computer program tangibly embodied in a storage medium, said computer program, when executed by a computer, causing the computer to function as a memory control apparatus in accordance with claim 12.

* * * * *